US009100248B2

(12) United States Patent
Vorne et al.

(10) Patent No.: US 9,100,248 B2
(45) Date of Patent: Aug. 4, 2015

(54) METHOD AND SYSTEM FOR EXTENDING THE CAPABILITIES OF EMBEDDED DEVICES THROUGH NETWORK CLIENTS

(75) Inventors: Ramon A. Vorne, Wood Dale, IL (US); Benjamin D. Saks, Wood Dale, IL (US); Ke Tang, Mount Prospect, IL (US)

(73) Assignee: Vorne Industries, Inc., Itasca, IL (US)

( * ) Notice: Subject to any disclaimer, the term of this patent is extended or adjusted under 35 U.S.C. 154(b) by 1286 days.

(21) Appl. No.: 12/151,229

(22) Filed: May 5, 2008

(65) Prior Publication Data

US 2008/0281944 A1 Nov. 13, 2008

Related U.S. Application Data

(60) Provisional application No. 60/927,978, filed on May 7, 2007.

(51) Int. Cl.
 G06F 17/00 (2006.01)
 H04L 29/08 (2006.01)
 (Continued)

(52) U.S. Cl.
 CPC .......... *H04L 29/08846* (2013.01); *H04L 67/04* (2013.01); *H04L 67/12* (2013.01);
 (Continued)

(58) Field of Classification Search
 CPC ............ G06F 11/0742; G06F 11/3013; G06F 13/4295; G06F 3/0481; H04L 29/08846; H04L 67/12; H04L 67/04; H04L 67/28; H04L 67/06; H04L 67/02; H04L 678/34; H04L 67/025
 USPC .......................... 715/200–208, 736–748, 749
 See application file for complete search history.

(56) References Cited

U.S. PATENT DOCUMENTS 5,796,633 A 8/1998 Burgess et al.
6,092,018 A 7/2000 Puskorius et al.
(Continued)

FOREIGN PATENT DOCUMENTS

CA 2445790 1/2004
EP 0 887 750 A2 12/1998
(Continued)

OTHER PUBLICATIONS

"Dynamic HTML and XML: The XMLHttpRequest Object", Jun. 24, 2005, http://developer.apple.com/internet/webcontent/xmlhttpreq/html, Apple, Inc.
(Continued)

*Primary Examiner* — Quoc A Tran
(74) *Attorney, Agent, or Firm* — Bishop Diehl & Lee, Ltd.

(57) ABSTRACT

A method and system for extending the capabilities of resource-constrained embedded devices by leveraging the memory and processing resources of clients such as web browsers ("clients") installed on host computational devices ("host computers"). The embedded device delegates computational tasks such as generation of content (e.g., user interfaces, reports, configuration files, etc.) to clients and acts as a simple file and data server. The embedded device provides static resource files to each client, including static template files and a client processing engine. The client processing engine: interprets processing instructions contained in static template files; utilizes managed communication channels to exchange dynamic data sets with the embedded device in real-time; generates various forms of content by processing, transforming, manipulating, and aggregating dynamic data sets and static resource files; and reads and writes arbitrarily large files from and to the host computer, overcoming resource limitations of the embedded device.

15 Claims, 13 Drawing Sheets

(51) Int. Cl.
*G06F 13/42* (2006.01)
*G06F 11/07* (2006.01)
*G06F 3/0481* (2013.01)
*G06F 11/30* (2006.01)

(52) U.S. Cl.
CPC .......... *G06F 3/0481* (2013.01); *G06F 11/0742* (2013.01); *G06F 11/3013* (2013.01); *G06F 13/4295* (2013.01); *H04L 67/02* (2013.01); *H04L 67/025* (2013.01); *H04L 67/06* (2013.01); *H04L 67/28* (2013.01); *H04L 67/34* (2013.01)

(56) References Cited

U.S. PATENT DOCUMENTS

| | | |
|---|---|---|
| 6,446,192 B1 | 9/2002 | Narasimhan et al. |
| 6,453,259 B1 | 9/2002 | Infiesto |
| 6,684,150 B2 | 1/2004 | Yasui et al. |
| 6,918,084 B1 | 7/2005 | Slaughter et al. |
| 7,065,574 B1 | 6/2006 | Saulpaugh et al. |
| 7,110,918 B2 | 9/2006 | Celestini |
| 7,320,028 B2 | 1/2008 | Dinovo |
| 8,014,308 B2 * | 9/2011 | Gates et al. ............. 370/252 |
| 2002/0083172 A1 | 6/2002 | Knowles et al. |
| 2002/0099829 A1 * | 7/2002 | Richards et al. ............. 709/227 |
| 2002/0169871 A1 | 11/2002 | Cravo de Almeida et al. |
| 2003/0009563 A1 | 1/2003 | Douglis et al. |
| 2003/0014149 A1 | 1/2003 | Kreidler et al. |
| 2003/0014150 A1 | 1/2003 | Flanagan et al. |
| 2003/0045964 A1 | 3/2003 | Lottgen et al. |
| 2003/0046436 A1 | 3/2003 | Govindaraj et al. |
| 2003/0081824 A1 | 5/2003 | Mennie et al. |
| 2003/0093522 A1 | 5/2003 | Motoyama |
| 2003/0122793 A1 | 7/2003 | Takasu et al. |
| 2004/0098148 A1 | 5/2004 | Retlich et al. |
| 2005/0108364 A1 | 5/2005 | Callaghan et al. |
| 2005/0114502 A1 | 5/2005 | Raden et al. |
| 2005/0289274 A1 * | 12/2005 | Ghercioiu et al. ............. 710/303 |
| 2006/0059462 A1 | 3/2006 | Yamamoto |
| 2007/0028224 A1 | 2/2007 | Huang |
| 2007/0028227 A1 | 2/2007 | Lebowitz |
| 2007/0121145 A1 | 5/2007 | Miura |
| 2007/0143838 A1 | 6/2007 | Milligan et al. |
| 2007/0168528 A1 | 7/2007 | Taniguchi et al. |
| 2007/0288855 A1 | 12/2007 | Rohrabaugh et al. |
| 2007/0300150 A1 | 12/2007 | Davis |
| 2008/0002760 A1 | 1/2008 | Nasielski et al. |
| 2008/0104699 A1 * | 5/2008 | Gounares et al. ............. 726/22 |
| 2008/0276181 A1 * | 11/2008 | Moromisato et al. ......... 715/740 |
| 2011/0143650 A1 * | 6/2011 | Robinson ..................... 455/3.02 |
| 2011/0191753 A1 * | 8/2011 | Ghercioiu et al. ............. 717/132 |
| 2013/0282966 A1 * | 10/2013 | Venkiteswaran ............. 711/103 |

FOREIGN PATENT DOCUMENTS

| | | |
|---|---|---|
| EP | 0 903 675 A1 | 3/1999 |
| EP | 0 967 766 | 12/1999 |
| EP | 1 324 535 A2 | 7/2003 |
| JP | 2000-20122 | 1/2000 |
| WO | WO 99/56447 | 11/1999 |
| WO | WO 00/21312 | 4/2000 |
| WO | WO 01/52320 | 7/2001 |
| WO | WO 03/021490 | 3/2003 |
| WO | WO 2005/045713 | 5/2005 |

OTHER PUBLICATIONS

"Cooling Tower Controller", Walchem Corporation, WebMaster, Holliston, MA (4 Pages) (date unknown).

"Boiler Controller", Walchem Corporation, WebMaster, Holliston, MA (4 Pages) (date unknown).

"The Shift Toward Web-Based Monitoring Solutions" by M. Drainville et al., Pumps & Systems Roating Equipment, pump-zone. com, Mar. 2002 (5 Pages).

* cited by examiner

["Assembly Line 12",202809600,3229,0.8851,4,0.8603,3233,0.9988,457,0.7605]
   ⎵           ⎵
  402         404

FIG. 4

```xml
<?xml version="1.0" encoding="UTF-8" ?>
<static_template_file>
    <header>              502    504
        <title index="0" label="Current Status - " format="@" />
        <subtitle index="1" label="Updated as of: " format="m/d/yyyy h:mm AM/PM" />
    </header>
    <stack_panel type="horizontal">
        <variable_box label="Counts">
            <variable index="2" label="Good Count" format="#,0" />
            <variable index="4" label="Reject Count" format="#,0" />
            <variable index="6" label="Total Count" format="#,0" />
            <variable index="8" label="Average RPH" format="#,0" />
        </variable_box>
        <variable_box label="OEE">
            <variable index="3" label="Availability" format="#,0.00%" />
            <variable index="5" label="Performance" format="#,0.00%" />
            <variable index="7" label="Quality" format="#,0.00%" />
            <variable index="9" label="OEE" format="#,0.00%" />
        </variable_box>
    </stack_panel>
    <footer />
</static_template_file>
```

510 — Counts variable_box
512 — OEE variable_box
508 — </stack_panel>
506 — </variable_box>

FIG. 5

```html
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
    <head>
        <title>Current Status - Assembly Line 12</title>
        <style type="text/css">
            body {font-family: "verdana"; width: 720px;}
            table {border-collapse: collapse; font-size: 10pt;}
            td {border: 0.5pt black solid;}
            thead {background-color: black; color: white; font-weight: bold;}
            .horizontal_stack_panel_element {float: left;}
            .name {font-weight: bold;}
            .stack_panel_final_element {clear: both;}
            .value {text-align: right;}
            #header {border-bottom: 2pt black solid; border-top: 2pt black solid;
                margin-bottom: 24pt; text-align: center;}
            #header h1 {font-size: 18pt; margin: 2pt 0pt 0pt;}
            #header h2 {font-size: 9pt; margin: 0pt 0pt 6pt;}
            #footer {font-size: 8pt; margin-top: 20pt; text-align: center;}
        </style>
    </head>
    <body>
        <div id="header"><h1>Current Status - Assembly Line 12</h1>
            <h2>Updated as of: 6/5/2006 8:00 AM</h2></div>
        <div class="horizontal_stack_panel">
            <div style="width: 50%;" class="horizontal_stack_panel_element">
                <table style="margin: auto; width: 300px;">
                    <thead><tr><td>Counts</td><td></td></tr></thead>
                    <tbody>
                        <tr><td class="name">Good Count</td><td class="value">3,229</td></tr>
                        <tr><td class="name">Reject Count</td><td class="value">4</td></tr>
                        <tr><td class="name">Total Count</td><td class="value">3,233</td></tr>
                        <tr><td class="name">Average RPH</td><td class="value">457</td></tr>
                    </tbody>
                </table>
            </div>
            <div style="width: 50%;" class="horizontal_stack_panel_element">
                <table style="margin: auto; width: 300px;">
                    <thead><tr><td>OEE</td><td></td></tr></thead>
                    <tbody>
                        <tr><td class="name">Availability</td><td class="value">88.51%</td></tr>
                        <tr><td class="name">Performance</td><td class="value">86.03%</td></tr>
                        <tr><td class="name">Quality</td><td class="value">99.88%</td></tr>
                        <tr><td class="name">OEE</td><td class="value">76.05%</td></tr>
                    </tbody>
                </table>
            </div>
            <div class="stack_panel_final_element"></div>
        </div>
        <div id="footer"> Powered by Vorne XL | <a href="http://www.vorne.com">www.vorne.com</a> |
            1-877-767-LEAN </div>
    </body>
</html>
```

```
<?xml version="1.0" encoding="UTF-8" ?>
<static_template_file type="rtf">
    <header>{\rtf1\ansi\deff0{\fonttbl{\f0\fswiss Verdana}}
        {\colortbl ;\red0\green0\blue0;\red255\green255\blue255;}
802     \margt720\margb720\margl1080\margr1080
    </header>
    <record_body>
        \pard\brdrt\brdrs\brdrw40\brdrcf1\brdrb\brdrs\brdrw40\brdrcf1\qc
808     {\b\fs4 \~\line\fs36 Shift Report - <variable format="@"/>
        \fs20\line Shift Start: <variable format="m/d/yyyy h:mm AM/PM"/>
        \fs12\line \~}\par\pard\fs20\par\par\par{\trowd \trgaph45
        <define text="cell">
810     \clbrdrt\brdrw10\brdrs\clbrdrl\brdrw10\brdrs\clbrdrb\brdrw10\brdrs\clbrdrr\brdrw10\brdrs
        </define>
        \clcbpat1\cellx2520
        <insert text="cell"/>\clcbpat1\cellx4680\cellx5400
812     <insert text="cell"/>\clcbpat1\cellx7920
        <insert text="cell"/>\clcbpat1\cellx10080
        \pard\intbl\cf2\ql {\b Counts}\cell\pard\intbl\cf2\qr {}\cell
        \pard\intbl\cf2\ql {}\cell
        \pard\intbl\cf2\ql {\b OEE}\cell\pard\intbl\cf2\qr {<define text="row">}\cell
        \row}{\trowd \trgaph45
        <insert text="cell"/>\cellx2520
        <insert text="cell"/>\cellx4680\cellx5400
        <insert text="cell"/>\cellx7920
        <insert text="cell"/>\cellx10080                    814
        </define>
        \pard\intbl\cf1\ql {\b Good Count}\cell\pard\intbl\cf1\qr {<variable format="#,0"/>}\cell
        \pard\intbl\cf1\ql {}\cell
        \pard\intbl\cf1\ql {\b Availability}\cell\pard\intbl\cf1\qr {<variable format="#,0.00%"/><insert text="row"/>
        \pard\intbl\cf1\ql {\b Reject Count}\cell\pard\intbl\cf1\qr {<variable format="#,0"/>}\cell
        \pard\intbl\cf1\ql {}\cell
        \pard\intbl\cf1\ql {\b Performance}\cell\pard\intbl\cf1\qr {<variable format="#,0.00%"/><insert text="row"/>
        \pard\intbl\cf1\ql {\b Total Count}\cell\pard\intbl\cf1\qr {<variable format="#,0"/>}\cell
        \pard\intbl\cf1\ql {}\cell
        \pard\intbl\cf1\ql {\b Quality}\cell\pard\intbl\cf1\qr {<variable format="#,0.00%"/><insert text="row"/>
        \pard\intbl\cf1\ql {\b Average RPH}\cell\pard\intbl\cf1\qr {<variable format="#,0"/>}\cell
        \pard\intbl\cf1\ql {}\cell                                          506
        \pard\intbl\cf1\ql {\b OEE}\cell\pard\intbl\cf1\qr {<variable format="#,0.00%"/>}\cell
        \row}
        \pard\par\par\pard\fs16\cf1\qc Powered by Vorne XL | {\field{\*\fldinst{HYPERLINK
806     "http://www.vorne.com"}}{\fldrslt{\cf1\ul www.vorne.com}}}\cf1 | 1-877-767-LEAN\par
    </record_body>
    <record_separator>\page</record_separator>
    <footer>}</footer>
</static_template_file>           804
```

FIG. 8

```
{\rtf1\ansi\deff0{\fonttbl{\f0\fswiss Verdana}}
        {\colortbl ;\red0\green0\blue0;\red255\green255\blue255;}
        \margt720\margb720\margl1080\margr1080
\pard\brdrt\brdrs\brdrw40\brdrcf1\brdrb\brdrs\brdrw40\brdrcf1\qc
{\b\fs4 \~\line\fs36 Shift Report - Assembly Line 12
\fs20\line Shift Start: 6/5/2006 8:00 AM
\fs12\line \~}\par\pard\fs20\par\par\par{\trowd \trgaph45
\clbrdrt\brdrw10\brdrs\clbrdrl\brdrw10\brdrs\clbrdrb\brdrw10\brdrs\clbrdrr\brdrw10\brdrs\clcbpat1\cellx2520
\clbrdrt\brdrw10\brdrs\clbrdrl\brdrw10\brdrs\clbrdrb\brdrw10\brdrs\clbrdrr\brdrw10\brdrs\clcbpat1\cellx4680
\cellx5400
\clbrdrt\brdrw10\brdrs\clbrdrl\brdrw10\brdrs\clbrdrb\brdrw10\brdrs\clbrdrr\brdrw10\brdrs\clcbpat1\cellx7920
\clbrdrt\brdrw10\brdrs\clbrdrl\brdrw10\brdrs\clbrdrb\brdrw10\brdrs\clbrdrr\brdrw10\brdrs\clcbpat1\cellx10080
\pard\intbl\cf2\ql {\b Counts}\cell\pard\intbl\cf2\qr {}\cell
\pard\intbl\cf2\ql {}\cell
\pard\intbl\cf2\ql {\b OEE}\cell\pard\intbl\cf2\qr {}\cell
\row}{\trowd \trgaph45
\clbrdrt\brdrw10\brdrs\clbrdrl\brdrw10\brdrs\clbrdrb\brdrw10\brdrs\clbrdrr\brdrw10\brdrs\cellx2520
\clbrdrt\brdrw10\brdrs\clbrdrl\brdrw10\brdrs\clbrdrb\brdrw10\brdrs\clbrdrr\brdrw10\brdrs\cellx4680\cellx5400
\clbrdrt\brdrw10\brdrs\clbrdrl\brdrw10\brdrs\clbrdrb\brdrw10\brdrs\clbrdrr\brdrw10\brdrs\cellx7920
\clbrdrt\brdrw10\brdrs\clbrdrl\brdrw10\brdrs\clbrdrb\brdrw10\brdrs\clbrdrr\brdrw10\brdrs\cellx10080
\pard\intbl\cf1\ql {\b Good Count}\cell\pard\intbl\cf1\qr {3,229}\cell
\pard\intbl\cf1\ql {}\cell
\pard\intbl\cf1\ql {\b Availability}\cell\pard\intbl\cf1\qr {88.51%}\cell
\row}{\trowd \trgaph45
\clbrdrt\brdrw10\brdrs\clbrdrl\brdrw10\brdrs\clbrdrb\brdrw10\brdrs\clbrdrr\brdrw10\brdrs\cellx2520
\clbrdrt\brdrw10\brdrs\clbrdrl\brdrw10\brdrs\clbrdrb\brdrw10\brdrs\clbrdrr\brdrw10\brdrs\cellx4680\cellx5400
\clbrdrt\brdrw10\brdrs\clbrdrl\brdrw10\brdrs\clbrdrb\brdrw10\brdrs\clbrdrr\brdrw10\brdrs\cellx7920
\clbrdrt\brdrw10\brdrs\clbrdrl\brdrw10\brdrs\clbrdrb\brdrw10\brdrs\clbrdrr\brdrw10\brdrs\cellx10080
\pard\intbl\cf1\ql {\b Reject Count}\cell\pard\intbl\cf1\qr {4}\cell
\pard\intbl\cf1\ql {}\cell
\pard\intbl\cf1\ql {\b Performance}\cell\pard\intbl\cf1\qr {86.03%}\cell
\row}{\trowd \trgaph45
\clbrdrt\brdrw10\brdrs\clbrdrl\brdrw10\brdrs\clbrdrb\brdrw10\brdrs\clbrdrr\brdrw10\brdrs\cellx2520
\clbrdrt\brdrw10\brdrs\clbrdrl\brdrw10\brdrs\clbrdrb\brdrw10\brdrs\clbrdrr\brdrw10\brdrs\cellx4680\cellx5400
\clbrdrt\brdrw10\brdrs\clbrdrl\brdrw10\brdrs\clbrdrb\brdrw10\brdrs\clbrdrr\brdrw10\brdrs\cellx7920
\clbrdrt\brdrw10\brdrs\clbrdrl\brdrw10\brdrs\clbrdrb\brdrw10\brdrs\clbrdrr\brdrw10\brdrs\cellx10080
\pard\intbl\cf1\ql {\b Total Count}\cell\pard\intbl\cf1\qr {3,233}\cell
\pard\intbl\cf1\ql {}\cell
\pard\intbl\cf1\ql {\b Quality}\cell\pard\intbl\cf1\qr {99.88%}\cell
\row}{\trowd \trgaph45
\clbrdrt\brdrw10\brdrs\clbrdrl\brdrw10\brdrs\clbrdrb\brdrw10\brdrs\clbrdrr\brdrw10\brdrs\cellx2520
\clbrdrt\brdrw10\brdrs\clbrdrl\brdrw10\brdrs\clbrdrb\brdrw10\brdrs\clbrdrr\brdrw10\brdrs\cellx4680\cellx5400
\clbrdrt\brdrw10\brdrs\clbrdrl\brdrw10\brdrs\clbrdrb\brdrw10\brdrs\clbrdrr\brdrw10\brdrs\cellx7920
\clbrdrt\brdrw10\brdrs\clbrdrl\brdrw10\brdrs\clbrdrb\brdrw10\brdrs\clbrdrr\brdrw10\brdrs\cellx10080
\pard\intbl\cf1\ql {\b Average RPH}\cell\pard\intbl\cf1\qr {457}\cell
\pard\intbl\cf1\ql {}\cell
\pard\intbl\cf1\ql {\b OEE}\cell\pard\intbl\cf1\qr {76.05%}\cell\row}
\pard\par\par\pard\fs16\cf1\qc Powered by Vorne XL | {\field{\*\fldinst{HYPERLINK
"http://www.vorne.com"}}{\fldrslt{\cf1\ul www.vorne.com}}}\cf1 | 1-877-767-LEAN\par}
```

FIG. 9

Shift Report - Assembly Line 12
Shift Start: 6/5/2006 8:00 AM

—1002

| Counts | |
|---|---|
| Good Count | 3,229 |
| Reject Count | 4 |
| Total Count | 3,233 |
| Average RPH | 457 |

| OEE | |
|---|---|
| Availability | 88.51% |
| Performance | 86.03% |
| Quality | 99.88% |
| OEE | 76.05% |

Powered by Vorne XL | www.vorne.com | 1-877-767-LEAN

FIG. 10

METHOD AND SYSTEM FOR EXTENDING THE CAPABILITIES OF EMBEDDED DEVICES THROUGH NETWORK CLIENTS

CROSS REFERENCE TO RELATED APPLICATIONS

This application claims the filing benefit of U.S. Provisional Patent Application Ser. No. 60/927,978 filed on May 7, 2007 and entitled "METHOD AND SYSTEM FOR EXTENDING THE CAPABILITIES OF EMBEDDED DEVICES THROUGH NETWORK CLIENTS", the disclosure of which is hereby incorporated by reference.

BACKGROUND

This invention relates to embedded devices connected to networks that have clients such as web browsers running on one or more host computers.

Embedded devices (i.e., devices which combine electronic hardware and software and possibly mechanical parts or other components, and which are specifically designed to perform a dedicated function or task; e.g., vending machines, appliances, motor controllers, printers) are often designed to work in conjunction with host computers to provide features such as enhanced user interfaces (using the host computer display), remote access (via a network to which both the host computer and embedded device are connected), and firmware upgrades (loading a new firmware version into the embedded device from the host computer). By leveraging the capabilities and resources of the host computer, the embedded device is able to overcome internal resource constraints that are inherent due to cost and/or size limitations of the embedded device. These constraints often manifest themselves as limitations in the amount of memory (e.g., bytes of random access memory) and/or processing power (e.g., processor speed, data bus size, instruction set, and onboard peripherals) of the embedded device.

Looking a bit closer at the issue of memory constraints in embedded devices, random access memory (RAM) is particularly of concern. Single-chip microcontrollers, which are often used in embedded devices, typically have limited RAM and rely on other types of memory (e.g., flash memory) to store programs and other constant data. For example, a currently popular microprocessor platform for embedded devices is the ARM7. Two of the leading ARM7 suppliers, Atmel Corporation and NXP Semiconductors, both offer ARM7 devices with network connectivity (in the form of Ethernet media access controllers). The Atmel AT91SAM7X family provides four times the amount of flash memory than RAM memory (e.g., the top-of-the-line AT91SAM7XC512 includes 512 KB flash and 128 KB RAM). The disparity is even more pronounced in the NXP LPC2368, which includes 512 KB flash and only 58 KB RAM. Since RAM is frequently a very limited resource in embedded devices, it is especially desirable to reduce RAM usage in embedded devices.

Two common techniques for leveraging the capabilities and resources of host computers are: i) installing custom software on each host computer that will interact with the embedded device, or ii) incorporating an HTTP server in the embedded device that generates content suitable for an HTTP client (i.e., web browser) on the host computer. Each method has its strengths and weaknesses.

A strength of custom software is that it enables resource-constrained embedded devices to thoroughly leverage the capabilities and resources of the host computer, due to the ability of custom software to access and control many aspects of the host computer.

A weakness of custom software is that it typically needs to be installed and maintained on each host computer that will access the embedded device. In practice, this is often cumbersome, time consuming, and expensive, especially in business environments where typically only IT departments are allowed to install software. Each new version of the custom software requires updates or new installations, and compatibility issues frequently arise due to interactions between the custom software and different versions of computer operating systems, different combinations of other custom software applications installed on the host computer, and/or mismatches between versions of the custom software and versions of the embedded devices.

A strength of incorporating an HTTP server in the embedded device is that it provides for a "zero footprint" client, meaning that a standard HTTP client (e.g., web browser) of a host computer can be used to access the embedded device from any host computer that has the client installed. Since the great majority of personal computers have web browsers pre-installed, this is a major improvement over custom software.

A weakness of incorporating an HTTP server in the embedded device is that resource constraints of the embedded device, such as the earlier mentioned memory and processing power limitations, can severely impact the user experience in terms of i) quality, such as the usability of a user interface or the sophistication of a report that can be generated, ii) quantity, such as the size of a report that can be generated or the size of a file that can be read, iii) responsiveness, such as how quickly the embedded device can generate requested content, and/or iv) scalability, such as the number of clients that can be simultaneously serviced.

Although there are technologies available that provide for varying degrees of client-side processing (e.g., Flash® Player by Adobe Systems Incorporated, OpenLaszlo™ by Laszlo Systems Incorporated, and the Java™ Runtime Environment by Sun Microsystems Incorporated), these technologies are typically not specifically designed or optimized for working with embedded devices and thus typically do not take into account the special requirements and limitations of resource-constrained embedded devices. As a result, existing technologies generally suffer from one or more of the following problems:

1. They are not designed to explicitly minimize memory usage (e.g., RAM and/or flash) and/or processing bandwidth in the server (i.e., embedded device) and may therefore not run effectively on resource-constrained embedded devices.
2. They do not provide tools for reading, writing, and/or manipulating arbitrarily large files while taking into account the limited resources of embedded devices.
3. They are not designed to dynamically update content or do so inefficiently.
4. They do not cleanly separate static content (which can be cached by the client) from dynamic content.
5. They are not designed for general client-side processing (e.g., they focus on presentation layer processing).
6. They require proprietary developmental tools (e.g., available only from a particular company, and/or only for a particular platform) thus limiting development options.

7. They require server-side components, programming languages and/or scripting languages that are not generally available for or are poorly suited for use on embedded devices.
8. They require additional software to be installed on the client (e.g., browser plug-ins).
9. They do not support a wide range of clients (e.g., a wide range of browser platforms).
10. They support only a single type of content (e.g., Flash® SWF files) or a limited range of content.
11. They do not provide tools for accessing resources from external domains.

Note that the preceding list of problems is intended to be illustrative in nature, and is not intended to serve as an exhaustive list of every aspect of existing technologies that may render them inappropriate for embedded devices.

Therefore, what is needed is an effective method for resource-constrained embedded devices to interact with host computers, which can ideally provide for one or more of the following:
1. A zero footprint client that does not require any custom software to be installed at the host computer.
2. A significant reduction in the amount of memory and processing power that is required by the embedded device to produce sophisticated, complex, and high quality content, including dynamic content.
3. An ability to generate content that is much larger (potentially orders of magnitude larger) than can fit within the available memory of the embedded device.
4. An ability to store arbitrarily large files to the host computer and/or to file systems accessible to the host computer.
5. An ability to read, process, and extract information from arbitrarily large files from the host computer and/or from file systems accessible to the host computer.
6. A solution that maximizes the amount of content that can be cached by the client.
7. A generalized and "generic" solution that is not significantly limited in the type of content that can be generated or the type of processing that can be performed at the client.
8. A solution that is not dependent on specific third-party products, browser plug-ins, development tools, etc.
9. A solution that is effective across a broad range of clients and embedded devices.
10. A solution that can be easily and flexibly adapted to the requirements of the specific application and to the resources of the specific embedded device.
11. An ability for the client to efficiently aggregate data from multiple embedded devices while placing minimal memory and processing requirements on the embedded devices.
12. A generally improved overall user experience when interacting with the embedded device through the host computer.

SUMMARY

There is disclosed herein a METHOD AND SYSTEM FOR EXTENDING THE CAPABILITIES OF EMBEDDED DEVICES THROUGH NETWORK CLIENTS that leverages the memory and processing resources of clients such as web browsers ("clients"), running on one or more host computers.

The network connected, resource-constrained embedded device ("embedded device") acts as a simple file and data server to clients, and these clients take on the responsibility of content generation and other computational tasks. Since clients running on host computers generally have access to orders of magnitude more memory and processing power than typical embedded devices, they are generally capable of generating far richer content and performing far more sophisticated computational tasks than embedded devices on their own.

Furthermore, multiple clients can concurrently process and manipulate files and data served from a single embedded device. The end result is a highly scalable system that maximizes the number of clients that can be concurrently supported by one embedded device, and that significantly enhances the quality (and quantity) of content that can be generated and the sophistication of computational tasks that can be performed.

Often, there may be a need to store or open this generated content at the host computer, but the client may not have the means to achieve this, typically due to security restrictions (e.g., the restrictions placed on commonly used web browsers for writing files to the host computer and/or to file systems accessible to the host computer). Various embodiments of the invention also include a method and system for reading and writing arbitrarily large files from and to the host computer and/or file systems accessible to the host computer (referred to as "file bouncing") while overcoming memory and processing limitations of the embedded device, as well as overcoming limitations imposed by client security restrictions.

The system, according to various embodiments, comprises four primary elements: a client processing engine, static template files, dynamic data sets, and managed communication channels. These elements are described in more detail below.

The client processing engine is responsible for coordinating work performed at the client on behalf of the embedded device. From the perspective of the embedded device, the client processing engine is simply a static resource (or a collection of static resources) stored on the embedded device and transmitted to the client on demand.

However, from the perspective of the client, once the client processing engine is loaded onto the client it is an executable program (e.g., a JavaScript program) responsible for performing client-side processing. The client processing engine interprets static template files and carries out the instructions specified therein. The client processing engine is explicitly intended and designed to minimize resources and processing required within the embedded device and to transfer work from the embedded device to the client. The client processing engine, in essence, becomes an "operating system" that runs within the client, and elevates the client from being a content delivery medium to being a processing "node" in a distributed computing system.

Static template files are responsible for providing information necessary to perform specific processing tasks (e.g., generate a report, render a web page, etc.). From the perspective of the embedded device, a static template file is simply a static resource transmitted to the client on demand. From the perspective of the client, a static template file contains a set of processing instructions for the client processing engine. In essence, the embedded device delegates processing tasks encompassed by static template files to the client, in order to minimize resources and processing required within the embedded device and to transfer work from the embedded device to the client.

Dynamic data sets are collections of data that are exchanged between the embedded device and the client. Unlike static template files, which are static resources, each dynamic data set is generated dynamically by the embedded device (or alternately by the client). JavaScript Object Notation (JSON), described by RFC 4627, is particularly useful as a dynamic data set format as it is very simple to parse and generate, and was specifically designed to provide a compact data representation. Dynamic data sets, in essence, encapsulate the "dynamic" aspect of content with a compact data representation, and, in concert with a variety of techniques that minimize the resources and processing required within the embedded device, further transfer work from the embedded device to the client.

Managed communication channels are bidirectional communication links between the client processing engine and an embedded device. The term "managed" refers to the fact that the communication channels are controlled by the client processing engine, not directly by the client as is traditionally the case. The client processing engine may use managed communication channels to maintain ongoing communication with one or more embedded devices in a seamless fashion that is invisible to the user. Managed communication channels may be implemented with a variety of techniques, such as XHR (XMLHttpRequest) and document manipulation. With document manipulation, the client processing engine alters existing content (e.g., HTML, XHTML, etc.), which causes the client to make a communication request to the embedded device. Document manipulation is accomplished via techniques such as JavaScript's document.write( ) method, modifications to the Document Object Model, and modifications to the document's innerHTML property.

The client processing engine parses each static template file and communicates with the embedded device using one or more managed communication channels to request, receive, and/or submit dynamic data sets, which the client processing engine uses in concert with static template files to generate, process, transform, manipulate, and/or aggregate content as well as perform other computational tasks.

File bouncing may be achieved by using, for example, the HTTP protocol, to send files to the embedded device in a series of one or more packets that the embedded device simply "bounces" back to the client. The embedded device only holds onto a given packet for as long as it takes to bounce that packet to the client, after which the packet may be discarded. Packets can be of arbitrary size, and the embedded device need only reserve memory resources sufficient to buffer a single packet at once (i.e., the embedded device does not need to store the entire file or even a significant portion thereof).

Files that are read from the host computer and/or from file systems accessible to the host computer (e.g., using HTML form-based file upload) using file bouncing are entirely available to the client processing engine, which may manipulate, transform, and/or selectively access their content as a proxy for the embedded device.

Files that are written to the host computer and/or to file systems accessible to the host computer (e.g., using the HTTP Content-Disposition header) using file bouncing are typically generated by the client processing engine from static template files and/or dynamic data sets. Dynamic data sets may be streamed from the embedded device to the client as the underlying data is produced, making it transitory from the perspective of the embedded device. While generating files the client processing engine may manipulate and/or transform content on behalf of the embedded device.

File bouncing can dramatically reduce the resources required by an embedded device to read, access, generate, and write arbitrarily large files from and to the host computer.

These and other aspects of the invention may be understood more readily from the following description and the appended drawings.

BRIEF DESCRIPTION OF THE DRAWINGS

The invention is described with reference to various embodiments that are illustrated in the drawings and following detailed description below.

FIG. 4 is an example of a dynamic data set containing real-time data generated by an embedded device.

FIG. 5 is an example of an abstract static template file.

FIG. 6 is an example of content generated by the client processing engine from the abstract static template file of FIG. 5 and the dynamic data set of FIG. 4.

FIG. 8 is an example of a literal static template file for generating a Rich Text Format document.

FIG. 9 is the content generated by the client processing engine from the literal static template file of FIG. 8 and the dynamic data set of FIG. 4.

FIG. 10 shows the content of FIG. 9 as rendered by a word processor.

DETAILED DESCRIPTION

Figure 1:
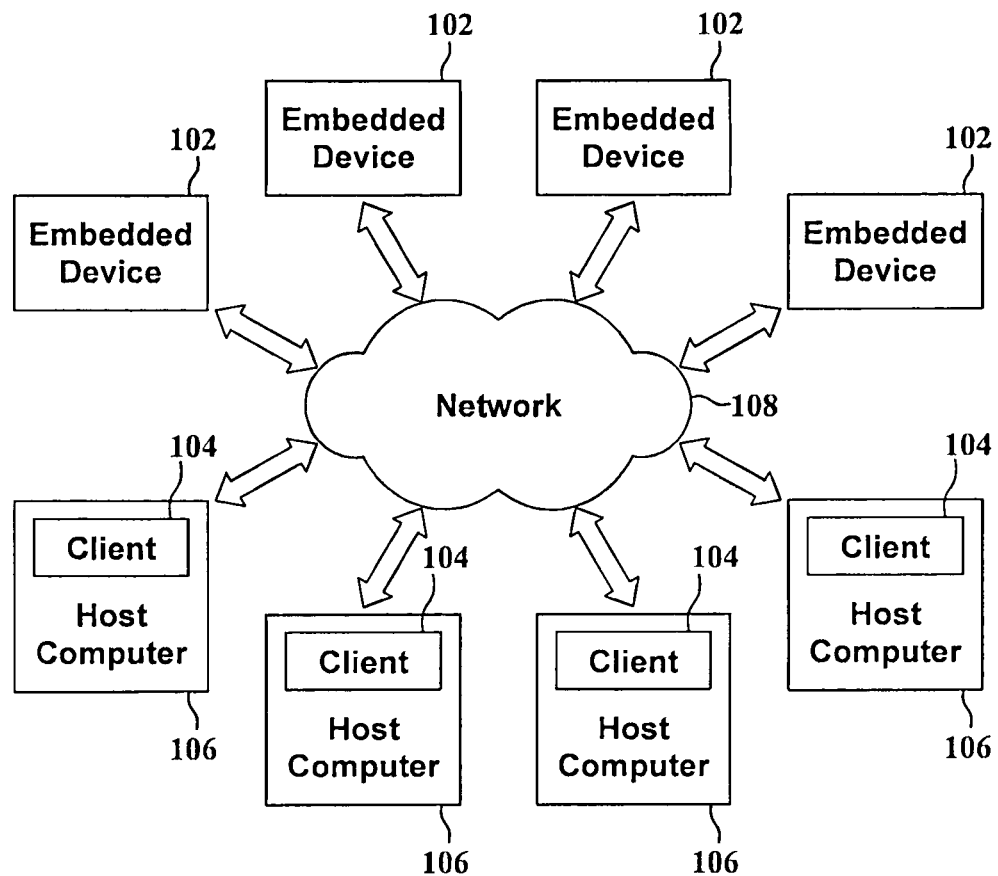
FIG. 1 is a block diagram showing a top-level view of network-connected embedded devices and host computers with clients.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Various embodiments of the invention provide a method and system for enabling network connected, resource-constrained embedded devices (henceforth referred to simply as "embedded devices") to leverage the memory and processing resources of clients such as web browsers (henceforth referred to as "clients"), which are installed on host computational devices such as personal computers or thin clients (henceforth referred to as "host computers"), in such a way as to overcome internal resource constraints of the embedded devices. A top-level view can be seen in FIG. 1, which shows a plurality of embedded devices 102, and a plurality of clients 104 on host computers 106, connected to a shared (i.e., a common) communication network 108.

The ability to use a standard web browser as the client 104 to interact with the embedded device 102 makes the solution "zero footprint" from the perspective of the host computer 106—no custom software needs to be installed since the great majority of host computers have such clients pre-installed.

Figure 2:
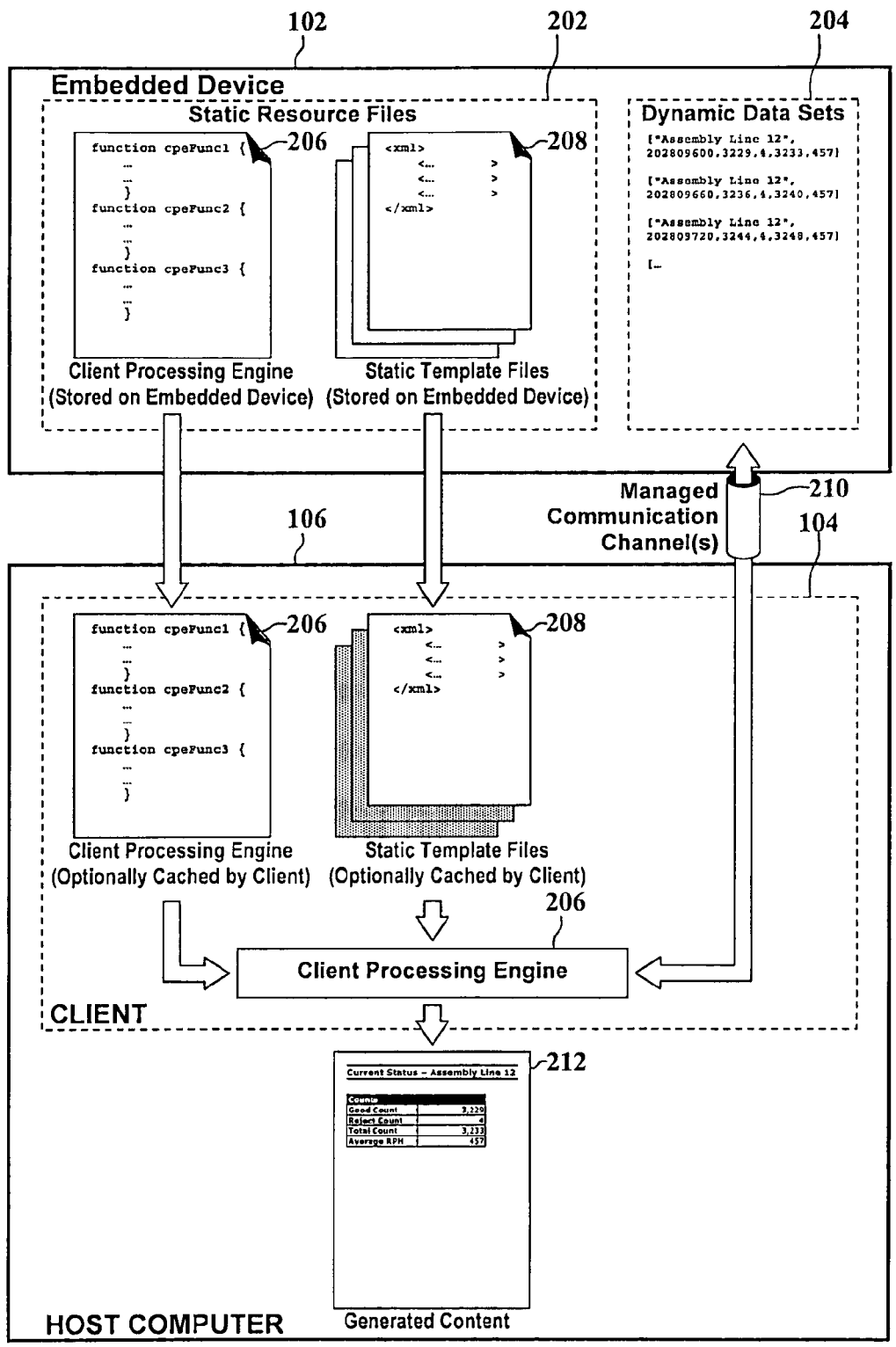
FIG. 2 is a block diagram showing relationships between primary elements of the system.

In order to minimize the processing performed by the embedded device 102, the embedded device takes on the role of a simple file and data server delivering two basic types of information, as can be seen in FIG. 2:

Static resource files 202 such as JavaScript and XML

Dynamic data sets 204 such as real-time data, in a compact format such as JSON (JavaScript Object Notation)

To be considered a "file" for the purposes of this discussion, a static resource need not be stored in a traditional file system. For example, a static resource could be stored as an object of some type (e.g., a sequence of bytes) in flash memory.

In the case of static resource files 202, the embedded device 102 simply transmits these files to the client 104 whenever they are requested. It does no significant processing on the files beyond transmission. The static resource files may be stored in flash memory of the embedded device, and may be transmitted as a sequence of small "packets" to the client thus minimizing the use of RAM resources.

In the case of dynamic data sets 204, the embedded device 102 transmits data in a simple and compact format such as the JSON format shown in FIG. 4.

Returning to FIG. 2, processing of dynamic data sets 204 by the embedded device 102 may be minimized by representing each data item in a form that closely parallels its native internal representation in the embedded device. For example, in the dynamic data set of FIG. 4, the data item date/time 404 has a value of 202809600, which represents the number of seconds since the turn of the century (seconds since 1/1/2000 12:00 AM), which in this example is also the internal date/time representation of the embedded device. The client processing engine may be capable of formatting this data item in many different ways, such as 6/5/2006, 2006-06-05T08:00:00, or 6/5/2006 8:00 AM. For example, the client processing engine formats date/time 404 as 6/5/2006 8:00 AM within subtitle 704 (FIG. 7) and subtitle 1002 (FIG. 10).

Returning to FIG. 2, the embedded device 102 focuses on serving files and raw data rather than focusing on generating final content (e.g., XHTML web pages, Rich Text Format reports, etc.). The client processing engine 206 is responsible for transforming the static template files 208 and the dynamic data sets 204 that it receives from the embedded device to produce the generated content 212. This division of responsibilities takes advantage of the fact that host computers 106, and the clients 104 running on them, typically have far greater memory and processing resources than embedded devices, often times by orders of magnitude.

Thus by taking on the role of a basic file and data server as described above, the embedded device can service many clients with few resources. Additionally, multiple clients can concurrently process and manipulate files and data served from a single embedded device. The end result is a highly scalable system that maximizes the number of clients that can be concurrently supported by one embedded device, and that significantly improves the quality of content that can be generated.

It is important to emphasize that the embedded device 102 is not responsible for content generation. It does not generate user interfaces, diagnostic interfaces, informational screens, reports, configuration files, etc. That responsibility is delegated to the client 104 through the client processing engine 206. The files and data served by the embedded device are processed, transformed, manipulated, and combined by the client processing engine to generate various forms of content 212. And, as illustrated in FIG. 2, the client processing engine 206 may be cached by the client 104, so it need only be loaded from the embedded device one time per client.

It is also important to emphasize that while the focus of this description is on client-side content generation, other processing tasks can also be delegated to the client (e.g., number crunching, data analysis, and data validation).

There are four primary elements that interact and that are shared between the embedded device 102 and the client 104: static template files 208, dynamic data sets 204, client processing engine 206, and managed communication channels 210.

Static Template Files

The first element is the static template file 208. Each static template file is stored in the embedded device 102 (e.g., in flash memory) and transferred to the client 104 as needed. Since each static template file is a static resource file, the embedded device simply reads it from its memory and transmits it to the client. No significant additional processing is needed at the embedded device. Typically, there will be a plurality of static template files stored in the embedded device.

From the perspective of the client 104, a static template file 208 provides a set of processing instructions. For example, a static template file may contain instructions that can be used to generate a web page, or a report, or it may contain general computational instructions. Static template files are generally written in a simple and compact way that can be parsed easily to generate content or perform other processing. XML is a logical format for static template files, as XML documents can be as simple or complex as needed for a particular application, and XML is easily parsed by clients such as web browsers.

Figure 7:
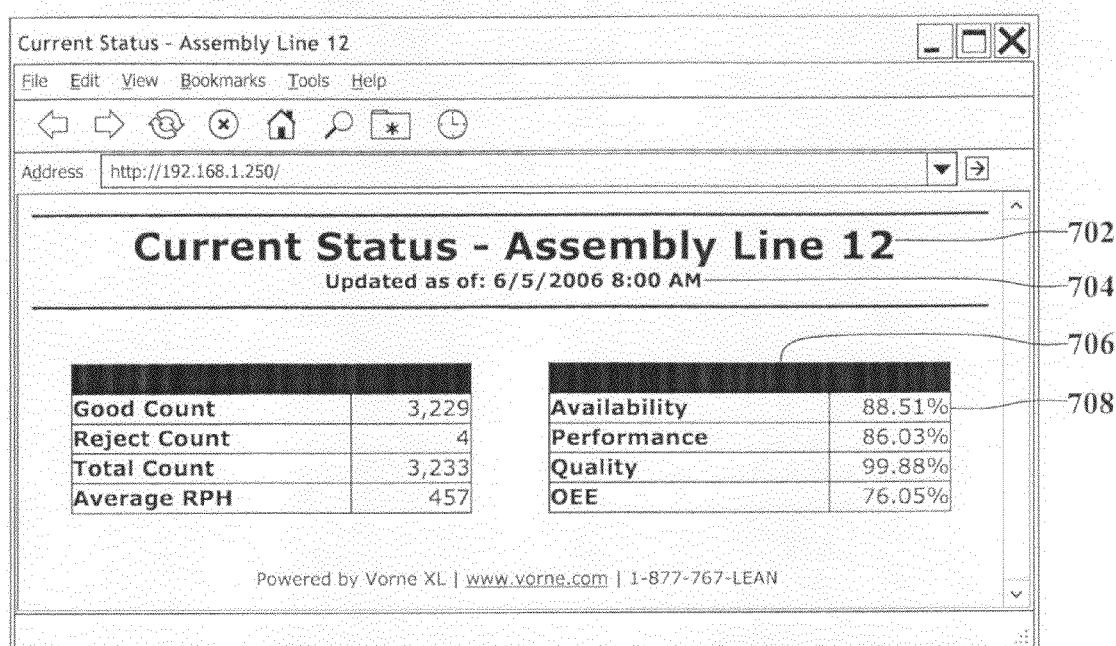
FIG. 7 shows the content of FIG. 6 as rendered by a web browser.

FIG. 5 shows an example of a static template file that could be used for generating a web page, FIG. 6 shows corresponding XHTML content generated by the client processing engine, and FIG. 7 shows the generated web page as it appears in a web browser. Similarly, FIG. 8 shows an example of a static template file used specifically for generating a Rich Text Format report, FIG. 9 shows corresponding Rich Text Format content generated by the client processing engine, and FIG. 10 shows the generated report as it appears in a word processor. In both cases, the source of dynamic data is the dynamic data set of FIG. 4.

Static template files can provide processing instructions that are abstract (i.e., describing the desired end result without providing explicit instructions on how to achieve it) and/or literal (i.e., describing explicitly how to achieve the desired end result).

The static template file shown in FIG. 5 contains abstract instructions that may be used to generate the web page shown in FIG. 7. Some of the key elements and attributes are as follows:

The label attribute 504 (FIG. 5) is used to provide text labels for many parts of the web page shown in FIG. 7, including the title 702, subtitle 704, variable box 706 (each variable box groups a collection of related name/value pairs), and variable 708 (each variable represents a single name/value pair).

Returning back to FIG. 5, the index attribute 502 identifies a data item from an associated dynamic data set to be inserted into the web page (e.g., as the value part of a name/value pair). This attribute is only necessary if the order in which the dynamic data set data items are used within the static template file is different from their order in the dynamic data set. For example, the index attribute 502 in the title element, which has an index value of "0", identifies and would be associated with the "Assembly Line 12" data item 402 (FIG. 4) of the dynamic data set. Note that the index is zero-based.

The format attribute 506 is used to provide formatting instructions for data items. In this example the formatting instruction convention (e.g., "#,0.00%") is very similar to the custom format codes used in the Excel® spreadsheet product by Microsoft Corporation.

The footer element 508 is an abstract instruction used to indicate that a page footer should be drawn at the bottom of the page. A standalone footer tag is suitable for applications that use a consistent footer across some or all pages, in which case the complete footer generation may be performed by the client processing engine. This illustrates another benefit of using static template files—abstract processing instructions can make it simpler to design content, and the client processing engine may be used to provide a degree of uniformity in the appearance and functionality of generated content. An example of client processing engine generated functionality is the hyperlink 602 (FIG. 6) included in the generated footer.

The variable_box 512 and stack_panel 510 elements are further examples of abstract instructions. A variable_box describes a certain type of presentation object (in this case a group of related name/value pairs, where each name/value pair is a variable element), and a stack_panel describes how to lay out presentation objects (in this case horizontally).

The static template file shown in FIG. 8 uses literal instructions to describe the Rich Text Format (RTF) report shown in FIG. 10. The example static template file of FIG. 8 supports a report format that consists of header element 802 content that is placed at the beginning of the report, record_body element 808 content that is repeated for each "data record", record_separator element 806 content that is placed between each data record, and footer element 804 content that is placed at the very end of the report. Thus, the example static template file of FIG. 8 could be used to generate a one page report or a 1,000 page report. For brevity FIG. 9 and FIG. 10 represent a one page report generated from the single data record shown in the dynamic data set of FIG. 4. Most of the example static template file of FIG. 8 is literal RTF content to be copied to the report. Some of the key elements and attributes are as follows:

The header element 802 and footer element 804 contain literal text to be placed at the beginning and end of the generated report, respectively. Likewise, the record_separator element 806 contains literal text to be placed between individual records (but not before the first record and not after the last record).

The record_body element 808 primarily contains literal text that is copied directly into the report with any leading and trailing whitespace removed.

The define element 810 and insert element 812 provide a simple mechanism used to avoid repetition of literal text, and thus reduce the size of a static template file. The define element captures a block of literal text at its point of first use so that it can be repeated (i.e., inserted) later with an insert element.

The variable element 814 marks each place where formatted dynamic data is to be inserted into the report. Note that a label attribute 504 (FIG. 5) is not required since the label is included as part of the literal text, and an index attribute 502 (FIG. 5) is not required as the order of the variable element data items is the same as their order in the dynamic data set. Also note that format attribute 506 (FIG. 8) has the same behavior as format attribute 506 (FIG. 5).

A static template file might include references to other static template files (or even to itself), thus enabling a "modular" approach to building sets of processing instructions for the client processing engine. As static resource files, static template files can be stored in the embedded device in compressed form (e.g., GNU zip format, also referred to as gzip format), which reduces the memory footprint in the embedded device. They can also be transferred to the client in compressed form (e.g., gzip format) to reduce the transfer time and conserve resources. The memory footprint in the embedded device may be reduced even further by loading static template files from one or more sources other than the embedded device (e.g., from an external host).

Static template files may also be created and/or modified at the client. For example, in addition to parsing static template files, the client processing engine may contain logic to generate them (typically in concert with information gathered through a user interface). Static template files created and/or modified in such a manner may be stored within the embedded device and/or interpreted immediately by the client processing engine (e.g., for "one-time" execution or to provide a preview feature). Static template files created and/or modified in such a manner, which are then stored within the embedded device, are still "static" from the perspective of both the embedded device (which need not do significant processing on them) and the client (which may cache them).

Note that although FIG. 5 shows abstract static template file instructions that are used to generate XHTML and FIG. 8 shows literal static template file instructions for generating RTF, this is simply for illustrative purposes. Nothing about XHTML requires abstract static template file instructions, and nothing about RTF requires literal static template file instructions. XHTML, RTF, and other types of content (e.g., charts, graphs, reports, documents, spreadsheets, web pages, etc.) can be generated using abstract and/or literal static template file instructions.

Moreover, the abstract static template file instructions shown in FIG. 5 are not limited to generating XHTML. The same static template file could be used to generate an RTF report similar to that shown in FIG. 10, simply by instructing the client processing engine to generate RTF instead of XHTML. In this manner, a given static template file and associated dynamic data set could be used to generate many different types of content (e.g., reports, documents, spreadsheets, web pages, etc.), as long as the client processing engine supports the target content types.

As described earlier, other tasks besides content generation may be delegated to the client by the embedded device. For example, a static template file may contain instructions to retrieve a dynamic data set, transform it, and then submit it back to the embedded device. This capability enables clients to function as nodes in a distributed computing network, with the embedded device offloading computationally intensive tasks to one or more clients that provide distributed processing support for a given embedded device at any given time.

FIG. 5 and FIG. 8 are provided for illustrative purposes, and are not intended to set limits or boundaries to the scope of static template file processing instructions. For example, static template file processing instructions could be used to implement an event system for responding to user actions or to implement a system for user input that validates numbers (e.g., specifying minimum, maximum, and special allowed values) and/or text strings (e.g., specifying allowed text patterns). An important point is that static template files are intended and designed to function as "cookie cutter" templates that provide instructions for generating content and/or computational processing instructions to the client processing engine, in order to minimize resources required within the embedded device and in order to transfer work from the embedded device to the client.

Dynamic Data Sets

Returning to FIG. 2 the second element is the dynamic data set 204. Each dynamic data set contains one set (i.e., one "collection" or "package") of data that is exchanged between the embedded device 102 and the client 104. Unlike static template files, which are static resources, each dynamic data set is generated dynamically by the embedded device (or client). Example formats for dynamic data sets are JSON and XML. JSON is simple to parse and generate, can represent data objects of arbitrary complexity, and was specifically designed to provide a compact data representation. FIG. 4 is an example of a simple JSON format dynamic data set with ten data items (each separated by a comma), which is used for generating the web page of FIG. 7 and the report of FIG. 10. As can be seen in FIG. 4, the example JSON dynamic data set is nearly entirely composed of pure data.

Using a compact and (nearly) pure data representation and minimizing the processing of dynamic data by the embedded device, as discussed earlier, are very important for optimizing (i.e., increasing) dynamic data set transfer speed and improving the scalability and responsiveness of the embedded device. For example, a report that shows manufacturing performance results by shift for the past year may contain data for 1,000 shifts, where each shift is represented by one portion (e.g., one data record) of a large (e.g., multiple data record) dynamic data set. Alternatively, a web page showing current manufacturing results may be updated multiple times per second, thus generating many thousands of dynamic data set transactions in one hour. In both cases, the amount of dynamic data generated is likely to be significant, and therefore the savings from a compact data representation is also likely to be significant. The memory footprint of a dynamic data set may be further reduced by compressing it before transferring it to the client (e.g., using gzip compression).

A compact data representation conserves RAM and other resources within the embedded device. Resource usage within the embedded device can be further reduced by generating the response to a client dynamic data set request in multiple parts, such that only one part of the response is stored in the memory of the embedded device at any time. For example, a dynamic data set that contains ten data records can be generated in ten parts, one for each record, such that only one of the ten data records of the response is stored in the RAM of the embedded device at any time.

The information needed to build a dynamic data set request may be implicitly associated with a static template file or explicitly included within a static template file. The static template file examples of FIG. 5 and FIG. 8 both rely on an implicit association with the static template file resource (nothing in the static template file explicitly identifies the dynamic data set request). Explicitly including a dynamic data set request within a static template file can be as simple as including a dynamic_data_set element with a query attribute such as query="SELECT*FROM Table1". Alternatively, the static template file can explicitly reference one or more pieces of data within the embedded device. For example, the index attribute 502 (FIG. 5) could be modified to reference a particular piece of data within the embedded device, with the client processing engine automatically constructing a dynamic data set query from the index attributes.

Although not required, the specification and generation of dynamic data sets can be simplified by logically organizing data within the embedded device into tables (as in a database). Data can then be queried using standard SQL SELECT statements even if the underlying data management in the embedded device is not a database as long as the embedded device includes a suitable "interpreter" for SQL. This is consistent with viewing the embedded device as a data server. Furthermore, using tabular organization, any piece of data in the embedded device can be referenced with a simple identifier composed of a table ID, row ID, and column ID.

A single dynamic data set can contain an arbitrary amount of data, which can be organized linearly (e.g., as tabular data) or hierarchically (e.g., as an "object" of arbitrary complexity).

Dynamic data sets may be generated by the embedded device and transmitted to the client, or alternately may be generated by the client and transmitted to the embedded device. For example, data entered at the client by the user may be "posted" to the embedded device as a dynamic data set.

Dynamic data sets can also be encrypted to provide data security, which makes this system suitable for use in high-security applications.

Dynamic data sets can be processed by the client processing engine to generate new information from existing data items (e.g., calculating sums and averages) without requiring additional work from the embedded device. The client processing engine can perform many different types of data manipulation and transformation, such as filtering, sorting, grouping and summarizing. This technique can be especially useful when the client aggregates data from multiple embedded devices as described later.

Note that the methods and techniques described herein are provided for illustrative purposes, and are not intended to set limits or boundaries to the scope of dynamic data set operations. An important point is that dynamic data sets are intended and designed to encapsulate the "dynamic" aspect of content with a compact representation, in order to minimize resources required within the embedded device and in order to transfer work from the embedded device to the client.

Client Processing Engine

Referring to FIG. 2, the third element is the client processing engine 206, which is a static resource file, or plurality of static resource files, stored in the embedded device 102 (e.g., in flash memory) and transmitted to the client 104 as required. The client processing engine is a static resource file, which means the embedded device simply reads the file from its memory and transmits it to the client. No significant further processing is needed at the embedded device.

Figure 3:
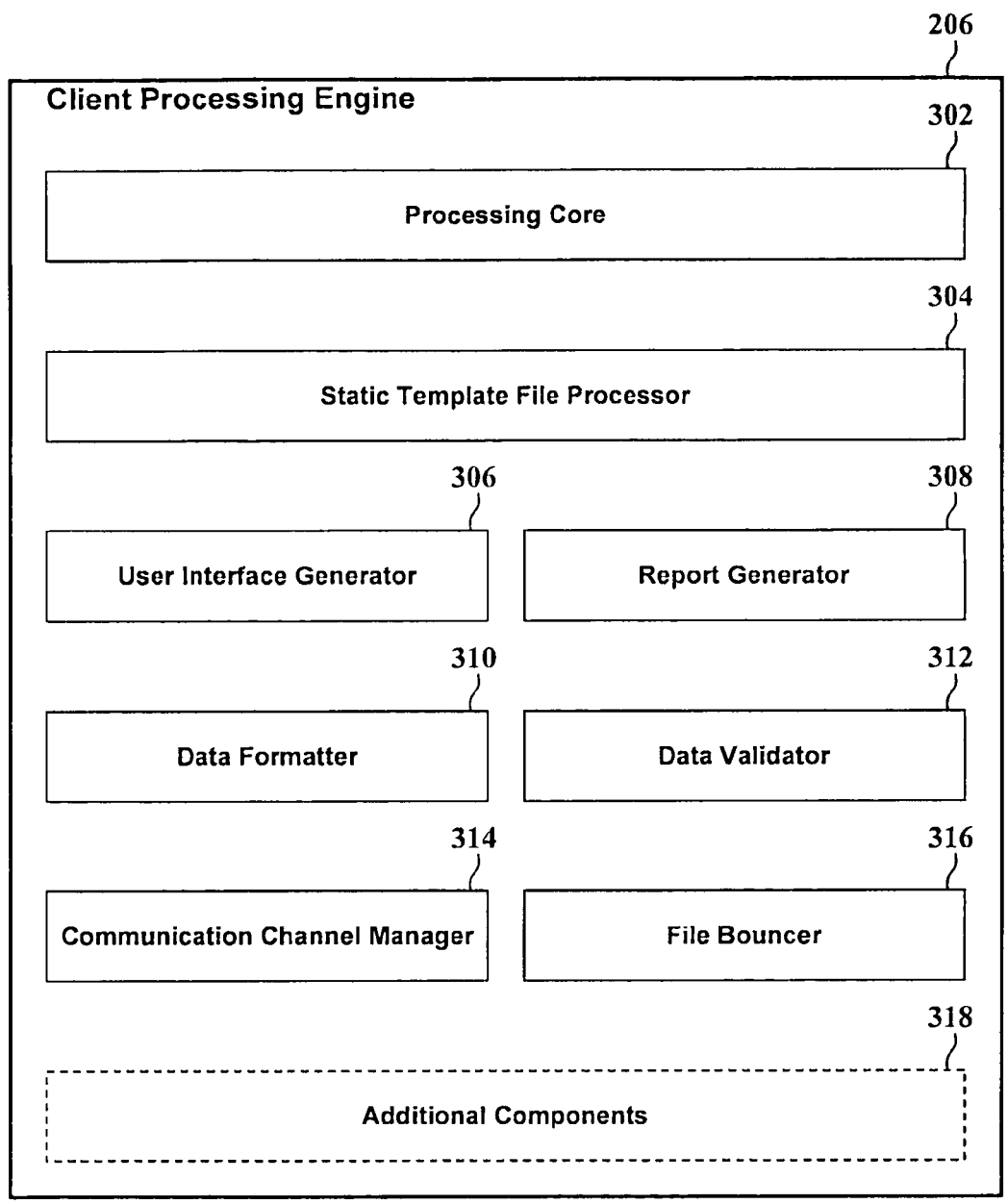
FIG. 3 is a block diagram showing subcomponents of the client processing engine.

Once it has been loaded by the client 104, the client processing engine 206 is an executable program, such as a JavaScript program, which interprets static template files and carries out the instructions specified therein. Carrying out those instructions generally requires the client processing engine to have additional capabilities. Referring to FIG. 3, the client processing engine may comprise a processing core 302 (which directs and controls the other sub-components of the client processing engine), a static template file processor 304, a user interface generator 306, a report generator 308, a data formatter 310, a data validator 312, a communication channel manager 314, a file bouncer 316 (which saves and loads files to and from the host computer and/or file systems accessible to the host computer), and possibly additional components 318. An important point is that the client processing engine 206 is explicitly intended and designed to minimize resources required within the embedded device and to transfer work from the embedded device to the client. Thus, FIG. 3 is provided for illustrative purposes, and is not intended to set limits or boundaries to the scope of the client processing engine.

With the current state of client technology, writing the client processing engine in the JavaScript language and writing static template files in XML can provide significant benefits, as it enables the client processing engine to take advantage of capabilities that are native to clients, such as the availability of extensive functionality for parsing, manipulating, and otherwise working with XML documents, which can dramatically reduce the complexity of the client processing engine.

The client processing engine can be as simple or complex as a particular application (i.e., type of embedded device) requires. For example, a meaningful (albeit limited) client processing engine can be built with 5 KB or less of JavaScript, while one that is feature rich might include 50 KB or more of JavaScript.

The client processing engine can also be designed as a series of modules (i.e., smaller files) that are dynamically loaded (transmitted to the client on demand). This reduces the initial loading time for a new client. Like other static resource files, the file(s) comprising the client processing engine can also be stored in a compressed form (e.g., gzip format), which reduces both the memory footprint in the embedded device and the initial loading time. The memory footprint in the embedded device may be reduced even further by loading the client processing engine or modules thereof from one or more sources other than the embedded device (e.g., from an external host as referenced by other resources loaded from the embedded device).

The client processing engine plays a central role in improving the scalability of the system, as it can run concurrently on any number of clients. Furthermore, the client processing engine performs both presentation tasks and business logic tasks (examples of the latter include managing communication, performing data validation and data manipulation, and generating complex reports), which elevates the client from being a content delivery medium to being a processing "node" in a distributed computing system.

Managed Communication Channel

Referring to FIG. 2 the fourth element is the managed communication channel 210. Managed communication channels are used by the client 104, specifically the client processing engine 206, to communicate with one or more embedded devices. The term "managed" refers to the fact that the communication channel is controlled by the client processing engine, not directly by the client as is traditionally the case. Managed communication channels enable the client processing engine to maintain ongoing communication with one or more embedded devices, transferring information between the client and embedded device in a seamless fashion that is invisible to the user, thus providing a superior user experience. For example, the client processing engine can use a managed communication channel to retrieve information that is used to dynamically update manufacturing performance management applications, such as a web page that shows manufacturing performance data in real-time (e.g., updating ten times per second) with no flicker, page reloads or other visual artifacts.

Managed communication channels 210 can also be used by the client to retrieve executable code (such as JavaScript) from the embedded device 102 "on demand" (i.e., only when it is actually needed), such as when the client processing engine 206 is designed as a series of dynamically loaded modules (as previously discussed).

There are a number of different methods that can be used to implement a managed communication channel. Two very useful methods are XMLHttpRequest (also referred to as XHR) and document manipulation.

XHR is a de facto standard for HTTP client-server communication and is available in various forms for current versions of popular clients such as the Internet Explorer® 6 and Internet Explorer® 7 web browsers from Microsoft Corporation, the Firefox® 1.5 and Firefox® 2 web browsers from Mozilla Corporation, the Safari™ 2 web browser from Apple Inc., and the Opera™ 9 web browser from Opera Software ASA. XHR can be used to request data from the embedded device (using GET) or to send data to the embedded device (using POST). Furthermore, XHR requests can be designated as either synchronous or asynchronous as needed. However, XHR is generally restricted to accessing resources in the local domain.

XHR can also be used indirectly to load executable code on demand by retrieving that code as a text string. For example, the following illustrates a known cross-platform JavaScript technique that makes code in a text string part of the global scope (where it is accessible to the client processing engine):

```
function add_to_global_scope(code_string)
{
    var global = this;
    if (window.execScript)
    {
        window.execScript(code_string);
        return null;
    }
    return global.eval ? global.eval(code_string) : eval(code_string);
}
```

Document manipulation, on the other hand, is particularly useful if non-local (i.e., cross) domain access is required. Document manipulation is a lesser known but very useful technique for managed communication, in which a resource is downloaded by dynamically adding a new tag to an existing web page, where said tag references the desired resource. For example, a JavaScript file can be downloaded by dynamically adding a <script> tag to the current page, such as <script src="http://192.168.1.240/data_1138.js">. The W3C DOM (World Wide Web Consortium Document Object Model), JavaScript's document.write( ) method, and the innerHTML property can all be used to perform document manipulation.

Referring to FIG. 1, an important use of document manipulation in this embodiment is to request dynamic data sets from multiple embedded devices 102 (i.e., from multiple domains and/or IP addresses). This enables any single client 104 with a client processing engine 206 (FIG. 2) to request, manipulate, transform, aggregate, and present data from a plurality of embedded devices. For example, the embedded device can serve a dynamic data set as a dynamically generated JavaScript file by formatting the data as JSON and assigning that formatted data to a JavaScript variable (thereby making the data part of a complete JavaScript statement). Whenever such a file is referenced at the client (e.g., through a dynamically generated <script> tag as described above), it will automatically be requested from the embedded device that is specified in the resource URL (i.e., in the src attribute of the <script> tag).

Managed communication channels are only loosely coupled to the communication methods described above. They can easily be adapted to use other methods as Internet standards (de facto or otherwise) evolve, such as the proposed W3C standard "Document Object Model (DOM) Level 3 Load and Save Specification".

Some of the techniques described above will work with both synchronous and asynchronous communication. Asynchronous communication is recommended as it generally provides a superior user experience. Note that this is a preference, not a requirement. In many cases the client processing engine will still function effectively if managed communication channels use synchronous communication instead of asynchronous communication.

Note that the methods and techniques described herein are provided for illustrative purposes, and are not intended to set limits or boundaries to the scope of managed communication channel operations. An important point is that managed communication channels serve as bidirectional communication links between the client processing engine running on a client and one or more embedded devices. They are used to exchange information that supports the objectives of minimizing resources required within the embedded device and transferring work from the embedded device to the client.

Interaction of Major Elements

To better understand how the client processing engine, static template files, dynamic data sets, and managed communication channels interact, the steps necessary to generate a web page with both static and dynamic elements are shown as a sequence diagram in FIG. 11 and are described in detail below.

Figure 11:
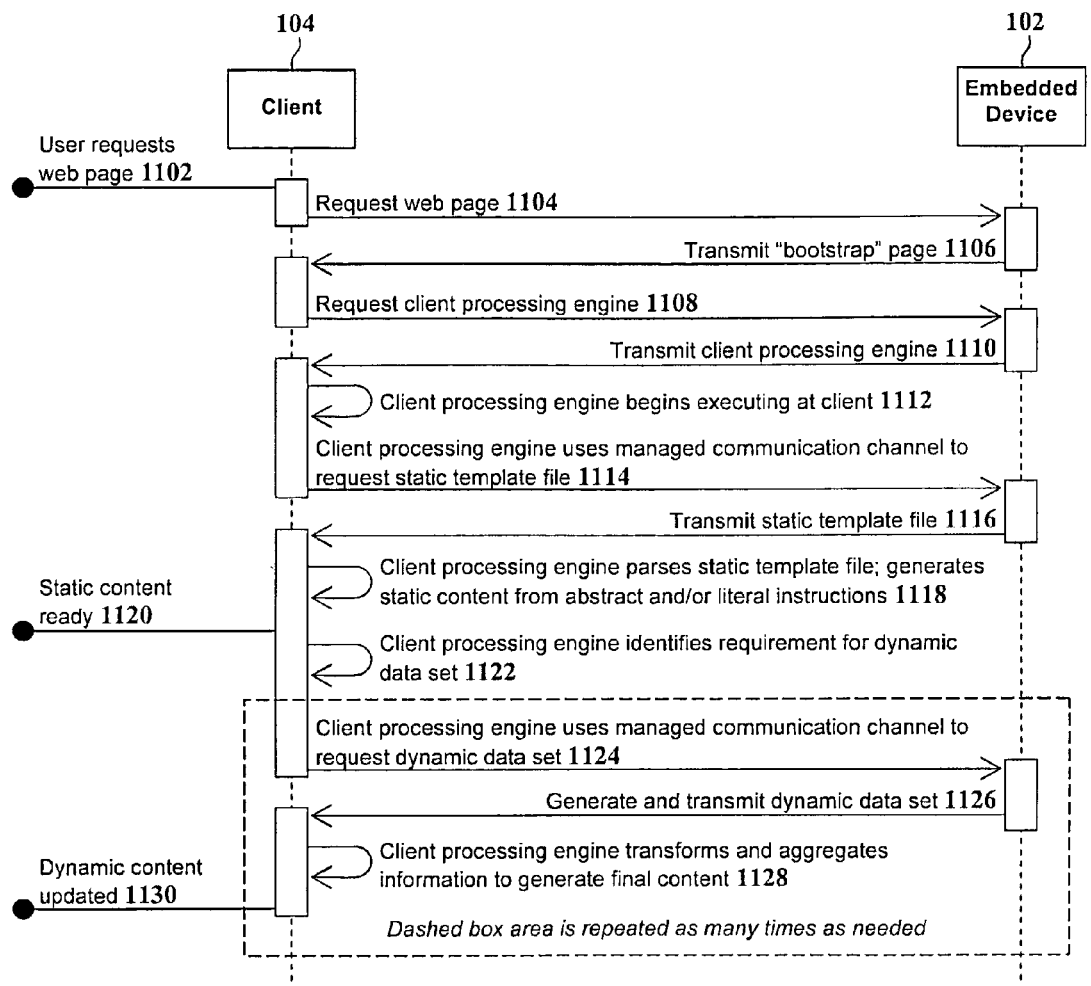
FIG. 11 is a sequence diagram showing steps for generating content with both static and dynamic elements.

In one embodiment of the invention, as illustrated in FIG. 11, purely static content is generated as follows:
1. The user requests a specific web page (e.g., by following a link or by entering a URL directly) (step 1102).
2. The client connects to the embedded device and requests the specific web page (URL) (step 1104).
3. The embedded device transmits the requested web page to the client. This page is referred to as a "bootstrap" page, since instead of the user-requested content, it contains the means to generate this content, via references to the client processing engine, one or more static template files, and optionally one or more dynamic data sets and other resources (step 1106).
4. The bootstrap page contains a reference to the client processing engine (e.g., through an HTML <script> tag), which causes the client to request the client processing engine from the embedded device (step 1108).
5. The embedded device transmits the client processing engine to the client (step 1110).
6. The bootstrap page received in item 3 above contains a call to the client processing engine entry function, causing the client to call the entry function and begin executing the client processing engine (step 1112).
7. The bootstrap page received in item 3 above specifies the URL of a static template file that contains instructions for generating the desired content, and the client processing engine requests that static template file using a managed communication channel (step 1114).
8. The embedded device transmits the static template file to the client (step 1116).
9. The client processing engine parses the static template file and generates the associated static content accordingly from abstract and/or literal processing instructions (step 1118).
10. The static content is ready (step 1120).

When the content includes dynamic elements the following additional steps are performed:
11. The client processing engine identifies a dynamic data set requirement associated with the static template file (e.g., an SQL SELECT statement that is included in the static template file). The dynamic data set requirement may be implicit or explicit as discussed earlier (step 1122).
12. The client processing engine uses a managed communication channel to request a dynamic data set (step 1124).
13. The embedded device generates the dynamic data set and transmits it to the client (step 1126).
14. The client processing engine transforms the dynamic data set data based on static template file processing instructions and aggregates the transformed data and the static content from item 10 (step 1128); and
15. For content that changes over time, such as a real-time manufacturing performance page, the client processing engine repeats items 12 through 14 for as long as the web page is kept open (step 1130).

The above steps focus on the interactions between the static template file, dynamic data set, client processing engine and managed communication channel. In actual implementations, additional static resource files, such as CSS (Cascading Style Sheets) files, image files, etc. are likely to be loaded, either directly, such as through references in the bootstrap web page, or indirectly as client processing engine resource requests through a managed communication channel. Also note that a bootstrap page may reference more than one static template file, in which case items 7 through 9 will be repeated for each static template file. Similarly, there may be more than one dynamic data set associated with a given static template file, in which case items 11 through 13 will be repeated until all dynamic data sets have been received. It will be apparent to one skilled in the art that these and other modifications may be made to the steps described above without departing from the spirit and scope of this particular embodiment.

Returning to FIG. 2, static resource files, such as the static template files 208, the client processing engine 206, and others as mentioned above should be cached by the client 104 whenever possible. The client does this by storing copies of the static template files, the client processing engine, and other files at the host computer 106. Since the resource is static and therefore is unchanging, the client can satisfy additional requests for the same resource by using this stored copy, saving time and resources within the embedded device 102 (which need not retransmit the same file). Client caching can significantly reduce the workload of the embedded device, as well as improve responsiveness of the client, so it is important that the embedded device provide support for client caching (e.g. using appropriate HTTP headers). Returning to FIG. 11, note that if the bootstrap page transmitted by the embedded device 102 in step 1106, the client processing engine transmitted by the embedded device in step 1110, and the static template file transmitted by the embedded device in step 1116 are cached by the client (as should typically be the case), they will not need to be transmitted again by the embedded device. Also note that with client caching, the client processing engine is received once and is then available to each and every bootstrap page loaded from the embedded device.

Returning again to FIG. 2, note that the embedded device 102 does not have to do any significant processing related to its stored static template file 208 and client processing engine 206 files. It simply transmits them to the client 104. Similarly, each dynamic data set 204 requires minimal processing from the embedded device. The dynamic data sets are (nearly) pure data with minimal formatting; and the client processing engine may read instructions from the static template file and transform the data accordingly. As described earlier, the embedded device acts as a file and data server, and the client processing engine is responsible for transforming static template files and dynamic data sets into useful content. This division of labor offloads a great deal of processing work from the embedded device to the network clients, greatly improving the scalability of the overall solution.

File Bouncing

Another feature of various embodiments of the present invention is the ability to read arbitrarily large files from the host computer (including reading such files from any file systems accessible to the host computer) and write arbitrarily large files to the host computer (including writing or storing such files to any file systems accessible to the host computer and opening such files at the host computer). For example, the user may want to store a report generated by the client (e.g., a report generated by the client processing engine) to the host computer for later access or for archiving. As another example, an embedded device may need access to a file that is stored on the host computer to perform certain tasks, yet the file is of a size that the resource limitations of the embedded device prevent the file from being stored within the memory of the embedded device.

Implementing this feature can be problematic because clients (e.g., web browsers) may tightly control access to host computer file systems for security reasons. The primary purpose of this control is typically to prevent potentially malicious programs (e.g., malicious JavaScript) from accessing the file system. These restrictions also make it difficult if not impossible for the client processing engine to read and write files from and to the host computer on its own, even with the user's explicit permission. Web browser clients typically do allow the user to grant permission to upload files accessible to the host computer to an HTTP server and download files from an HTTP server to the host computer (it should be noted that embedded devices that include HTTP servers could participate in such operations). However, as mentioned above, the embedded device may not have the resources necessary to store an entire file, or even a significant portion of a file, in memory, even for a short time. This is particularly true if it is desirable for the embedded device to be able to handle multiple files in this manner simultaneously. Furthermore, as mentioned earlier, a mechanism is needed for content (e.g., reports, documents, spreadsheets, etc.) generated by the client processing engine to be able to be stored or opened by the host computer.

The solution to these problems is a system and method which addresses the aforementioned security restrictions, while at the same time enabling resource-constrained embedded devices to read and write arbitrarily large files from and to the host computer (with the user's permission).

File bouncing facilitates the following scenarios:
Files from the host computer, with the user's permission, can be loaded into the client, which often will have orders of magnitude more memory than the embedded device. Once loaded within the client, files can be accessed and manipulated at will by the embedded device, using the client processing engine as its intermediary.

Content generated by the client (typically by the client processing engine working as a proxy for the embedded device), with the user's permission, can be stored or opened as a file at the host computer.

With file bouncing, the client sends the file (i.e., the contents of the file) to the embedded device in a series of one or more packets, which the embedded device simply "bounces" back to the client (hence the name "file bouncing"). The embedded device only holds onto a given packet for as long as it takes to bounce that packet back to the client, after which the packet is discarded. Thus, the embedded device does not need to store the entire file, and it does minimal processing on the packets. The packets can be of arbitrary size, and the embedded device need only reserve memory resources sufficient to buffer a single packet at once (although throughput can be improved by buffering multiple packets simultaneously). When more than one file is "bounced" simultaneously, each file is said to use a different file bouncing "channel".

File bouncing could be performed by having the client send a packet (i.e., a portion of the file) to the embedded device, the embedded device sending the packet back to the client and waiting for the client to send the next packet, and the process repeating until there are no more packets to send (i.e., the entire file has been "bounced"). However, not all communication protocols and/or clients support this type of behavior. For example, a communication protocol as specified or as implemented (such as HTTP) might require the client to send its entire request (i.e., the entire file) before the server (i.e., embedded device) may begin to send its response. Therefore, a more generalized solution is to use two cooperating connections to achieve a similar result: packets received from the client through the first connection are returned to the client through the second connection, as described below and as illustrated in FIG. 12 and FIG. 13.

Figure 12:
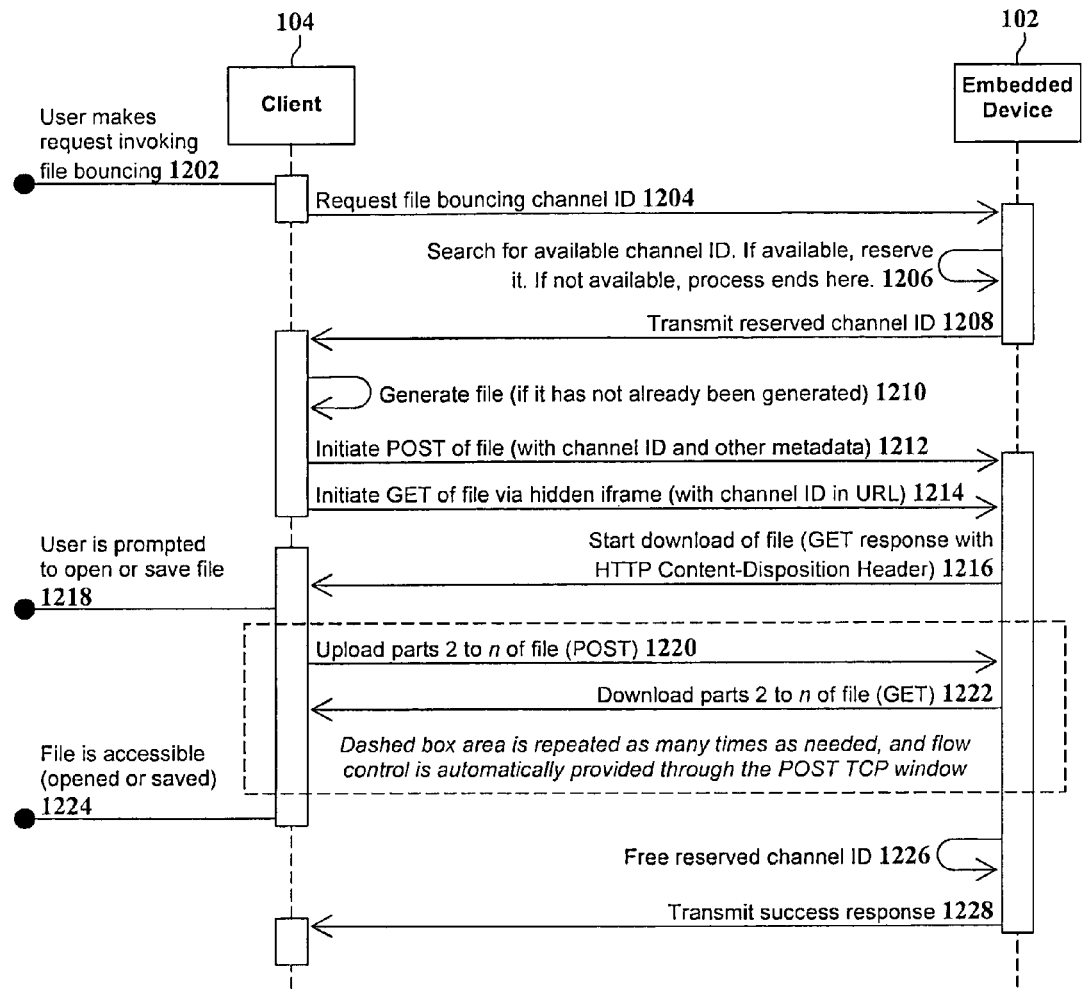
FIG. 12 is a sequence diagram showing steps for using file bouncing to store content generated at the client to the host computer.
Figure 13:
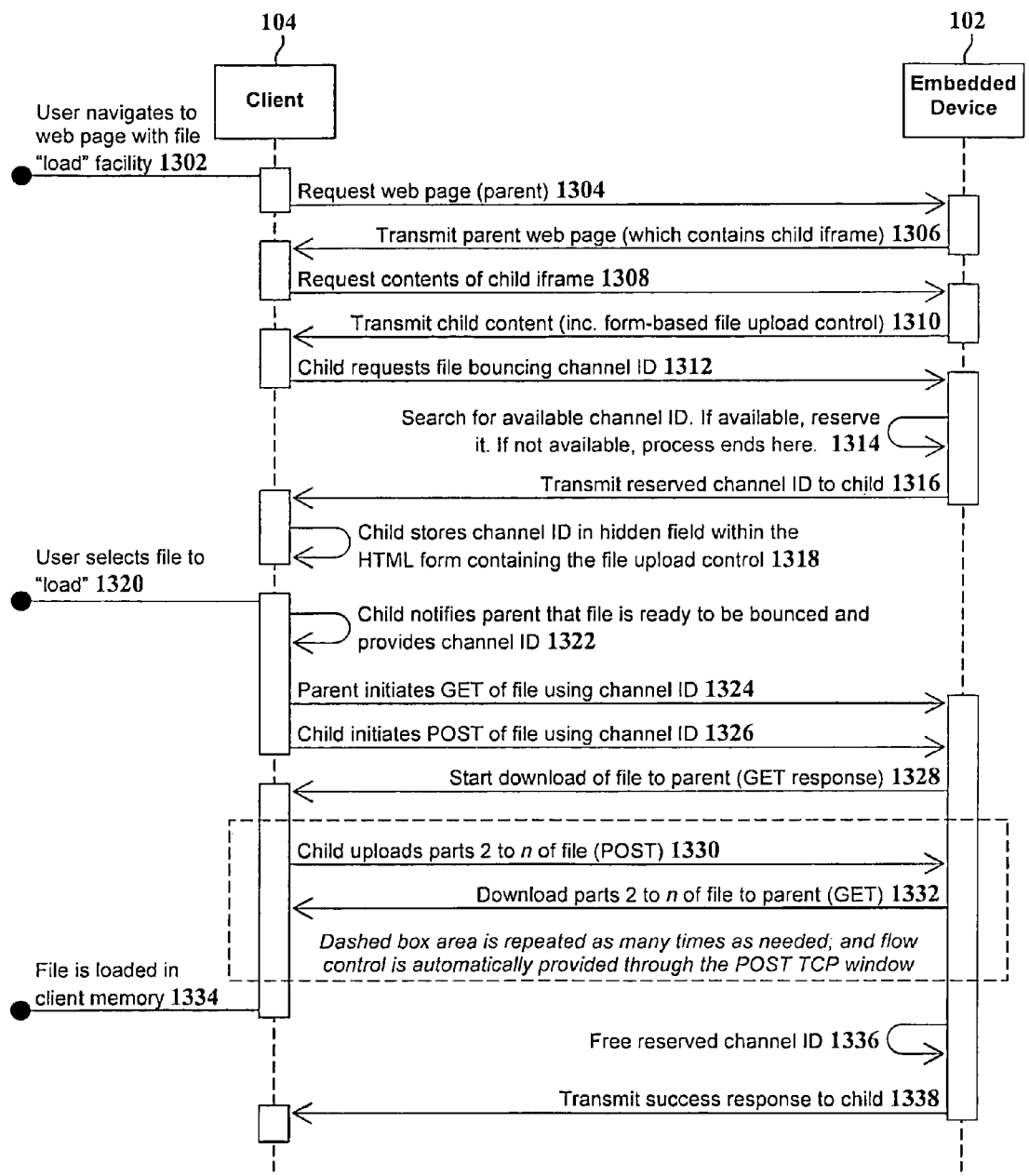
FIG. 13 is a sequence diagram showing steps for using file bouncing to load a file accessible to the host computer (but not directly accessible to the client) into the client.

In one embodiment of the invention, the steps to store (i.e., write) a file generated by the client to the host computer are shown in FIG. 12, and are outlined in more detail below. It will be apparent to one skilled in the art that various modifications may be made to the steps described herein without departing from the spirit and scope of this embodiment.

1. The user makes a request that will invoke file bouncing in some application-specific manner (step 1202).
2. The client processing engine uses a managed communication channel to request a file bouncing channel ID (each channel ID reserves resources at the embedded device, including the resources for two HTTP connections) (step 1204).
3. The embedded device searches for an available channel ID (step 1206).
   If it has a channel ID available, it marks the corresponding channel as reserved.
   If it does not have a channel ID available, a file bounce cannot be performed at this time (an appropriate response is sent to the client, which in turn displays a message for the user, and the process ends here).
4. The embedded device transmits the channel ID for the channel reserved in item 3 above to the client (step 1208).
5. If the file to be stored (e.g., a report) has not yet been generated, the client processing engine performs any actions necessary to generate the file (step 1210).
6. The client processing engine uses a managed communication channel to initiate a POST of the generated file, along with the channel ID and any other associated metadata (e.g., file name, file size, file MIME type, etc.) to the embedded device. Note that the embedded device places the file data (i.e., content, not metadata) included in this POST in a buffer associated with the specified channel ID (step 1212).
7. The client processing engine concurrently issues a GET request that includes the channel ID as a URL parameter to initiate retrieval of the file being bounced. This request is made via a hidden iframe on the web page to cleanly separate the GET request from the POST request. Some clients may place restrictions on opening the iframe programmatically in which case a user action such as a button click can be used to trigger its creation (step 1214).
8. The embedded device transmits the appropriate HTTP headers in response to the GET request of item 7 above, including an HTTP Content-Disposition header for the file being bounced. The first part of the file may also be transmitted by the embedded device at this time. Refer to the use of the buffer as described in items 10 and 11 below (step 1216).

9. When the client (browser) receives the Content-Disposition header, it opens a dialog box that allows the user to select whether the file should be opened or saved to the host computer when the download is complete (step 1218).
10. As a result of the POST request initiated at item 6 above, the embedded device receives up to one TCP window's worth of data from the client, which is placed in a buffer associated with the specified channel ID (step 1220).
11. The embedded device removes data (i.e., file content) from the buffer associated with the specified channel ID (see item 10 above) and transmits it to the client (via the GET response initiated in item 7 above) (step 1222).
12. Items 10 and 11 above are repeated until the complete file has been "bounced", at which point the file will be opened or saved at the host computer (depending on the user's selection at item 9 above) (step 1224).
13. The embedded device marks the channel ID as free (step 1226).
14. The embedded device sends an appropriate (application-specific) response to the client to confirm that the POST request of item 6 above has been completed (step 1228).

In one embodiment of the invention, the steps to load (i.e., read) a file from the host computer to the client (web browser) are shown in FIG. 13, and are outlined in more detail below. It will be apparent to one skilled in the art that various modifications may be made to the steps described herein without departing from the spirit and scope of this embodiment.

1. The user navigates to a web page that will invoke file bouncing to select (and ultimately load) a file from the host computer. This page is referred to as the parent (step 1302).
2. The client connects to the embedded device and requests the parent web page (step 1304).
3. The embedded device transmits the parent to the client, which contains an iframe (referred to as the child). Note that the child is used to select and POST the file and the parent is used to GET and access the file (step 1306).
4. The client requests the iframe content (i.e., the child) from the embedded device (step 1308).
5. The embedded device transmits the child (which includes an HTML form-based file upload control that will be used to select the file to be uploaded) to the client (step 1310).
6. The client processing engine uses a managed communication channel (from the child) to request a file bouncing channel ID from the embedded device (each channel ID reserves resources at the embedded device, including the resources for two HTTP connections) (step 1312).
7. The embedded device searches for an available channel ID (step 1314).
If it has a channel ID available, it marks the corresponding channel as reserved.
If it does not have a channel ID available, a file bounce cannot be performed at this time (an appropriate response is sent to the child, which in turn displays a message for the user, and the process ends here).
8. The embedded device transmits the channel ID for the channel reserved in item 7 above to the client (step 1316).
9. The child stores the channel ID in a hidden field within the HTML form that contains the file upload control (which causes it to be uploaded with the rest of the form later) (step 1318).
10. The user selects the desired file from the host computer with the file upload control, and clicks a confirmation button when the file has been selected (step 1320).
11. The child notifies the parent that the file is ready to be bounced and provides the channel ID to the parent (step 1322).
12. Having been notified by the child, the parent uses a managed communication channel to initiate a GET request to retrieve the file from the embedded device. The embedded device places this request on hold while it waits for the file data from the child (step 1324).
13. The child uses a standard POST request (i.e., a managed communication channel is not required) to initiate the form submit (note that because of the HTML form-based file upload control, the form submit includes the file). Note that the embedded device places the file data (i.e., content, not metadata) included in this POST in a buffer associated with the specified channel ID (step 1326).
14. The embedded device transmits the appropriate HTTP headers to the parent in response to the GET request of item 12 above. The first part of the file may also be transmitted by the embedded device at this time. Refer to the use of the buffer as described in items 15 and 16 below (step 1328).
15. As a result of the POST request initiated at item 13 above, the embedded device receives up to one TCP window's worth of data from the child and places it in a buffer associated with the specified channel ID (step 1330).
16. The embedded device removes data (i.e., file content) from the buffer associated with the specified channel ID (see item 15 above) and transmits it to the parent (step 1332).
17. Items 15 and 16 above are repeated until the complete file has been "bounced", at which point the complete file has been loaded into the parent, where the client processing engine can freely access and manipulate it (step 1334).
18. The embedded device marks the channel ID as free (step 1336).
19. The embedded device sends an appropriate (application-specific) response to the child to confirm that the POST request of item 13 above has been completed (step 1338).

Note that in both of the examples outlined above, only a very small part of the file need be resident in the embedded device at any time. For example, using file bouncing a 10 MB (or larger) file can be read or written with only a 10 KB (or smaller) RAM buffer in the embedded device, offering a 1,000 times (or more) reduction in required memory for the embedded device.

File bouncing may use the TCP window (which controls the number of bytes of data that can be transmitted over a given connection without an acknowledgement from the receiver) to provide automatic flow control and a degree of synchronization between two cooperating connections used to implement a file bouncing channel. As data is uploaded to the embedded device the POST connection TCP window of the embedded device is filled, and as data is downloaded to the client via the GET connection the POST connection TCP window of the embedded device is emptied. In this manner, the POST connection TCP window may be used to "pace" the file bounce. This enables loose coupling between the two HTTP connections associated with a file bouncing channel in the embedded device. The client will only transmit data to the embedded device (via the POST connection) if the embedded device has buffer space within its POST connection TCP window, and the embedded device will simply transmit data to the client (via the GET connection) as fast as it can (as permitted by the client's analogous TCP window).

This use of two cooperating HTTP connections makes file bouncing somewhat unusual. For example, HTTP servers normally handle each connection independently; whereas file bouncing utilizes a degree of coordination and cooperation between the two HTTP connections participating in a given file bouncing channel (they are in essence "paired"). Note that because the two HTTP connections used in file bouncing operate simultaneously, the managed communication channels described in this section use asynchronous communication.

Another unusual aspect of file bouncing is how it deals with content (the files). Normally files are stored in their entirety within the HTTP server. Even dynamically-generated files can generally be considered to have a continuous existence, in the sense that the server can generate a copy of the file as needed. With file bouncing, however, the bounced files are completely transitory from the server's (i.e., embedded device's) perspective. Once a given packet is transmitted from the embedded device (and acknowledged by the client) it disappears from the embedded device's perspective (it is no longer needed).

The examples given use pairs of HTTP connections; however it is also possible to use FTP connections for file bouncing. A person skilled in the art will realize that various combinations of connection types are possible.

It is interesting to look at time-based results recorded from a test implementation of client-side content generation combined with file bouncing. A host computer (with a 3 GHz Pentium® D processor from Intel Corporation) and an embedded device (with a 200 MHz ARM920T® core from ARM Limited) were connected via a local area network (100 Mbps Ethernet). The client (Internet Explorer® 6 web browser from Microsoft Corporation) retrieved a bootstrap page, client processing engine, static template file (for generating a Rich Text Format report) and dynamic data set from the embedded device, using managed communication channels as appropriate, in approximately 4 seconds, after which the client generated a 1,000 page report (3.6 MB) in approximately 35 seconds, followed by the client and embedded device participating in a file bouncing session to save the report to the host computer file system in approximately 8 seconds.

One of the benefits of the described system is improved scalability. For example:

The client processing engine can be loaded on any number of clients, each of which becomes another processing entity in the system. For example, one embedded device can have 100 clients, each of which uses the client processing engine to offload work from the embedded device.

One static template file can be used to generate content that is repeatedly updated (i.e., dynamic elements of the content are repeatedly refreshed) over arbitrary time durations. For example, the client processing engine can use a static template file to generate a web page that is refreshed in real-time (e.g., ten times per second) with new data from the embedded device, while placing a minimal load on the embedded device. Using the example of FIG. 4 (a dynamic data set of approximately 74 characters), FIG. 5 (a static template file of approximately 817 characters), and FIG. 6 (a generated document of approximately 2,093 characters), and assuming the web page is refreshed ten times per second for one minute (600 updates), a comparison can be drawn between the client processing engine generating the content and requiring approximately 45,000 bytes to be transmitted from the embedded device to the client (817 bytes for the static template file and 74 bytes per dynamic data set times 600 updates) versus the embedded device generating the same content and requiring approximately 1,256,000 bytes to be transmitted from the embedded device to the client (2,093 characters per page times 600 updates).

One static template file can be used to generate content of arbitrary "depth", acting in essence as a content "cookie cutter". For example, one static template file can be used by the client processing engine to generate hundred or even thousand page reports, where each page is generated from the static template file and one record of a multiple record dynamic data set.

The division of static resources (e.g., the client processing engine and the static template files) from dynamic resources (the dynamic data sets), maximizes the amount of cacheable information. Generally, the only resources that cannot be cached are dynamic data sets, which are composed entirely of dynamic data—all other resources may typically be cached by the client. This provides a very significant advantage over dynamic web pages generated server-side (i.e., by the embedded device), which cannot be cached but might still contain a large amount of static content. It also means that the embedded device spends most of its time on the core task of serving dynamic data (via dynamic data sets). This benefit is further amplified by the use of (nearly) pure data in the dynamic data set as exemplified in the preferred embodiment.

The division between static resources and dynamic resources also provides other benefits. For example, it cleanly separates presentation and style information (found within the static template file) from data (found within the dynamic data set). This allows the two to vary independently—data from several dynamic data sets can be presented in the same style, and a single dynamic data set can be presented in several different styles. An example of the latter can be seen in a comparison between FIG. 6 and FIG. 9, which illustrates how the same dynamic data set (shown in FIG. 4), in combination with two different static template files (FIG. 5 and FIG. 8), may be used to generate markedly different output (the web page of FIG. 7 and the RTF report of FIG. 10); or alternately how the same dynamic data set (FIG. 4) and static template file (FIG. 5), may be used to generate markedly different output (the web page of FIG. 7 and the RTF report of FIG. 10) merely by directing the client processing engine to generate a different type of content.

Furthermore, this division between static resources and dynamic resources can greatly reduce the processing and resources required for data encryption. Data security can be provided simply by encrypting the dynamic data sets. Static resources typically do not contain private information and can be transferred freely without encryption. Therefore, the described system can greatly reduce the amount of information to be encrypted. Once again, this benefit is further amplified by the use of (nearly) pure data in the dynamic data set as exemplified in the preferred embodiment.

The described system also keeps the RAM requirements of the embedded device very low. For example, static resource files such as the client processing engine and the static template files can be stored in flash memory or other low-cost storage, with RAM usage limited to a small number of outstanding "packets" as a file is being transmitted to a client.

Furthermore, the separation of static resources and dynamic resources minimizes the amount of RAM required to build and store a dynamic data set while it is being transmitted to a client, since dynamic data sets are entirely dynamic data instead of a mixture of static and dynamic content. Furthermore, the use of file bouncing minimizes the memory (typically RAM) required by the embedded device to read and write files from and to the host computer.

While the described system requires only minimal resources from the embedded device, the transfer of content generation and other processing to the host computer means that this does not detract from the user experience. Quite the contrary, since host computers are generally orders of magnitude above embedded devices in terms of memory and processing power, they are capable of generating content that is much larger and more sophisticated than would be possible for the embedded device on its own.

It should be explicitly noted that the described embodiments are not dependent on specific third-party companies, products, or development tools; and do not require any custom software, including any special browser plug-ins, to be installed at the host computer. They are "generic" in their requirements—all of the required files (e.g., client processing engine and static template file) can be created with a simple text editor (such as the Notepad text editor from Microsoft Corporation) and no "special" requirements are placed upon the host computer. For example, the primary elements of the described embodiments have been successfully tested across a range of popular HTTP clients, including the Internet Explorer® 6 and Internet Explorer® 7 web browsers from Microsoft Corporation, the Firefox® 1.5 and Firefox® 2 web browsers from Mozilla Corporation, the Safari™ 2 web browser from Apple Inc., and the Opera™ 9 web browser from Opera Software ASA.

Furthermore, it should be noted that the described embodiments require only very basic HTTP support from the embedded device, which is an important consideration for resource-constrained embedded devices. Nothing in the embodiments described herein requires support for additional server-side technologies such as PHP, CGI, or ASP.NET. This helps keep resource requirements low, allowing various embodiments of the invention to be used even in very "small" embedded systems.

What is claimed is:

1. A method for enabling an embedded device to work in concert with a client on a host computer, to access content of a file, comprising the steps of:
   selecting a file accessible to the host computer, but not directly accessible to the client, at the client;
   establishing a communication link between the client and the embedded device;
   sending a portion of the file from the client to the embedded device of a size that fits within the resource limitations of the embedded device, which then returns the portion to the client;
   adding the portion of the file returned by the embedded device to any previous portions received at the client; and
   repeating the previous sending and adding steps until the file has been completely reconstructed at the client;
   wherein the client accesses the reconstructed file as a proxy for the embedded device.

2. The method as described in claim 1, wherein the communication link protocols are selected from the group consisting of HTTP, FTP, and any combination thereof.

3. The method as described in claim 1, wherein the reconstructed file comprises content that is at least one of processed, transformed, manipulated, and aggregated at the client.

4. The method as described in claim 1, further comprising the step of using a plurality of communication links to concurrently access content of multiple files.

5. The method as described in claim 1, wherein the communication link comprises a first connection that sends the portion of the file and a second connection that returns the portion.

6. The method as described in claim 5, further comprising the step of using a TCP window to provide automatic flow control between the first connection and the second connection.

7. The method as described in claim 1, wherein the method is utilized for manufacturing performance management applications.

8. A method for enabling an embedded device to work in concert with a client on a host computer to generate a file at the client to be stored or opened via the host computer, comprising the steps of:
   generating content of a file in a memory of the client having limited access to file systems accessible to the host computer;
   establishing a communication link between the client and the embedded device;
   determining one of the following at the client:
      where the file shall be stored in the file system accessible to the host computer; and
      whether the file shall be opened;
   sending a portion of the file from the client to the embedded device of a size that fits within the resource limitations of the embedded device, which returns the portion back to the client;
   adding the portion of the file returned from the embedded device to any previous portions of the file received at the host computer;
   repeating the previous sending and adding steps until the entire file has been completely sent and returned; and,
   either storing or opening the entire file consistent with the determining step.

9. The method as described in claim 8, wherein the communication link protocols are selected from the group consisting of HTTP, FTP, and any combination thereof.

10. The method as described in claim 8, wherein the step of generating content comprises generating content in real time from data as that data is provided by the embedded device.

11. The method as described in claim 8, wherein the step of generating content comprises processing information received by the client from the embedded device in one of the following ways: transformation, manipulation, aggregation, and any combination thereof.

12. The method as described in claim 8, further comprising the step of using a plurality of communication links to concurrently send and return multiple files.

13. The method as described in claim 8, wherein the communication link comprises a first connection that sends the portion of the file and a second connection that returns the portion.

14. The method as described in claim 13, further comprising the step of using a TCP window to provide automatic flow control between the first connection and the second connection.

15. The method as described in claim 8, wherein the method is utilized for manufacturing performance management applications.

\* \* \* \* \*